United States Patent
Burke et al.

(10) Patent No.: US 7,381,888 B2
(45) Date of Patent: Jun. 3, 2008

(54) GRADE LEVEL ENCLOSURES FOR UNDERGROUND UTILITY CONNECTIONS

(75) Inventors: Edward J. Burke, Temecula, CA (US); Robert H. Gwillim, Murrieta, CA (US)

(73) Assignee: Channell Commercial Corporation, Temecula, CA (US)

( * ) Notice: Subject to any disclaimer, the term of this patent is extended or adjusted under 35 U.S.C. 154(b) by 0 days.

(21) Appl. No.: 11/373,614

(22) Filed: Mar. 9, 2006

(65) Prior Publication Data

US 2006/0231279 A1   Oct. 19, 2006

Related U.S. Application Data

(60) Provisional application No. 60/659,849, filed on Mar. 9, 2005.

(51) Int. Cl.
*H02G 9/00* (2006.01)
(52) U.S. Cl. .............. 174/38; 174/37; 174/39; 52/3; 52/169.6; 220/4.28; 361/364; 49/33
(58) Field of Classification Search ............ 174/37–39, 174/50, 17 R, 58, 135; 361/664, 369, 364, 361/641; 52/3, 169.6; 220/484, 4.28; 312/298, 312/223.6; 248/906; 49/33
See application file for complete search history.

(56) References Cited

U.S. PATENT DOCUMENTS

| 229,857 | A | 7/1880 | Brainerd |
|---|---|---|---|
| 589,780 | A | 9/1897 | Howard |
| 673,957 | A | 5/1901 | Lang |
| 1,163,397 | A | 12/1915 | Ford |
| 1,170,094 | A | 2/1916 | Neff |
| 1,203,885 | A | 11/1916 | Lombard |
| 1,270,236 | A | 6/1918 | Eckfeldt |
| 1,342,563 | A | 6/1920 | More |
| 1,433,430 | A | 10/1922 | Taylor |
| 1,604,330 | A | 10/1926 | Witkowski |
| 1,684,983 | A | 9/1928 | Clark |
| 1,878,544 | A | 9/1932 | Schmidt |
| 2,330,306 | A | 9/1943 | Murphy |
| 2,420,478 | A | 5/1947 | Hasselhorn et al. |
| 3,538,236 | A | 11/1970 | Baumgartner |
| 3,618,275 | A | 11/1971 | Ance et al. |
| 3,929,360 | A | 12/1975 | Gulistan |
| 3,952,908 | A | 4/1976 | Carson |
| 3,985,258 | A * | 10/1976 | Quigley et al. ............ 220/4.28 |
| 4,158,102 | A | 6/1979 | Bright |

(Continued)

FOREIGN PATENT DOCUMENTS

DE   70 34 179   12/1970

(Continued)

OTHER PUBLICATIONS

International Search Report dated Jul. 18, 2006, for corresponding PCT/US2006/008605, in the name of Channell Commercial Corporation.

*Primary Examiner*—Dhiru R. Patel
(74) *Attorney, Agent, or Firm*—Christie, Parker & Hale, LLP.

(57) ABSTRACT

A grade level box for use with underground utilities connections having vertical walls reinforced with exterior vertical and horizontal ribs integrally molded with the wall structure.

14 Claims, 11 Drawing Sheets

U.S. PATENT DOCUMENTS

| | | | |
|---|---|---|---|
| 4,163,503 A | | 8/1979 | McKinnon |
| 4,186,952 A | | 2/1980 | Glass |
| 4,365,108 A | | 12/1982 | Bright |
| 4,443,654 A | | 4/1984 | Flachbarth et al. |
| 4,864,467 A | * | 9/1989 | Byrd et al. ................ 361/664 |
| 5,401,902 A | | 3/1995 | Middlebrook et al. |
| 5,627,340 A | * | 5/1997 | Smith et al. ................ 174/482 |
| 5,791,098 A | * | 8/1998 | Thomas ..................... 52/169.6 |
| 6,073,792 A | | 6/2000 | Campbell et al. |
| 6,357,804 B1 | | 3/2002 | Bernier et al. |
| 6,362,419 B1 | | 3/2002 | Gallagher et al. |
| 6,455,772 B1 | * | 9/2002 | Leschinger et al. .......... 174/38 |
| 6,568,226 B1 | | 5/2003 | Ramsauer |
| 6,667,437 B2 | * | 12/2003 | Schenk ....................... 174/38 |
| 6,676,176 B1 | | 1/2004 | Quandt |
| 6,698,853 B2 | | 3/2004 | Chen et al. |
| 6,953,209 B2 | | 10/2005 | Jackson, Jr. et al. |
| 7,030,315 B1 | | 4/2006 | Dunn et al. |
| 7,038,127 B2 | | 5/2006 | Harwood |

FOREIGN PATENT DOCUMENTS

| | | |
|---|---|---|
| EP | 1 467 454 A1 | 10/2004 |
| FR | 2 330 177 | 5/1977 |

\* cited by examiner

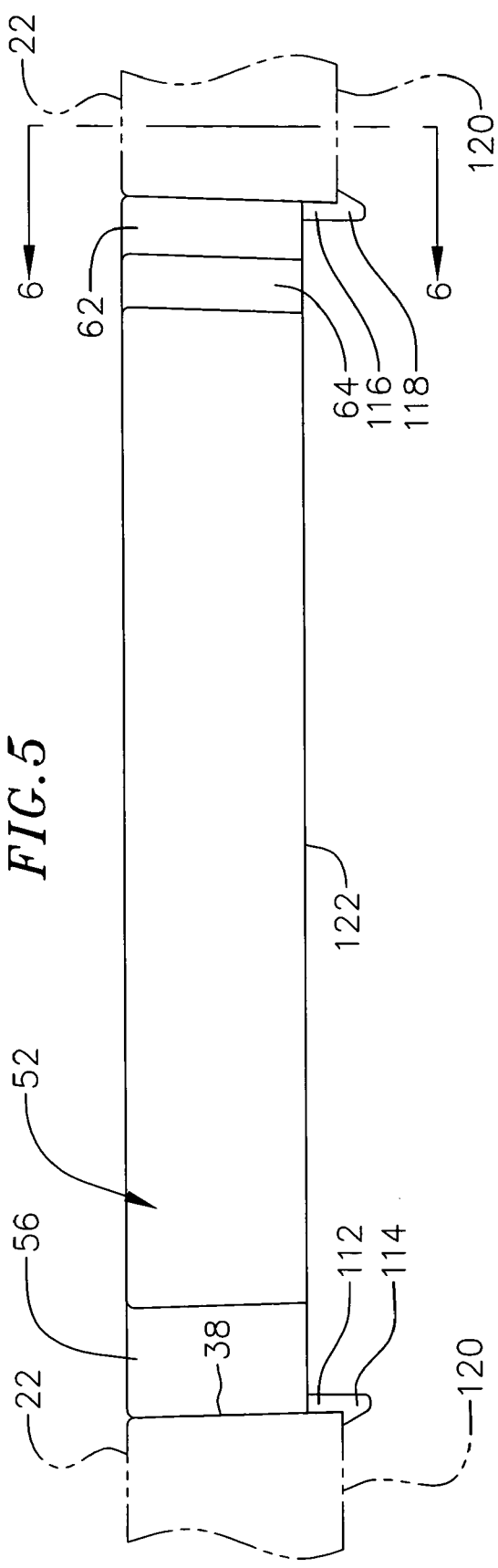
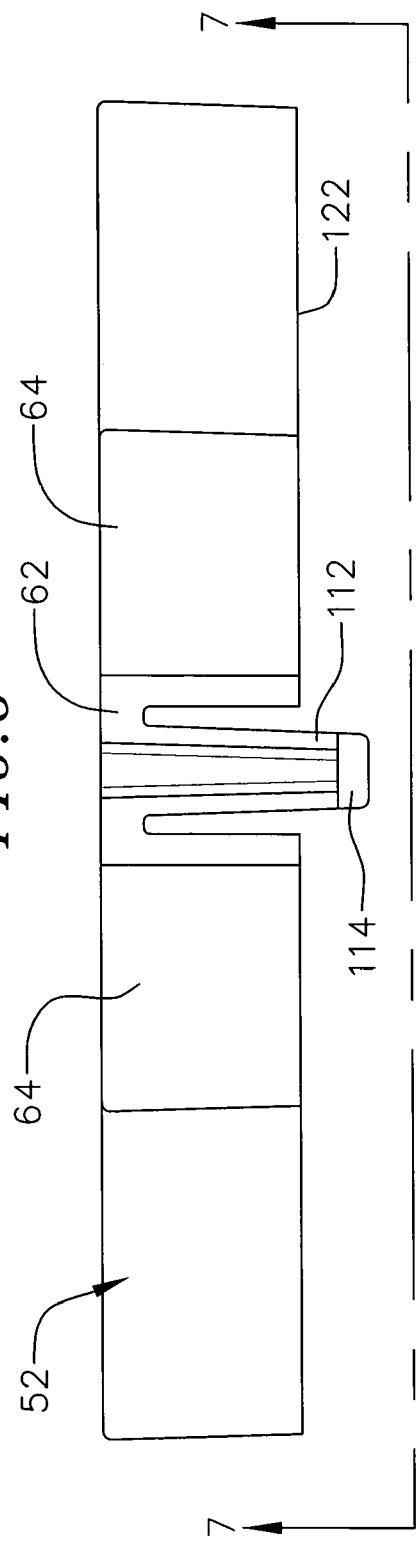

GRADE LEVEL ENCLOSURES FOR UNDERGROUND UTILITY CONNECTIONS

CROSS-REFERENCE TO RELATED APPLICATION

This application claims priority to Provisional Application No. 60/659,846, filed Mar. 9, 2005, the entire disclosure of which is incorporated herein by reference.

FIELD OF THE INVENTION

This invention relates to enclosures for buried and underground electrical transmission lines and related electrical devices and contacts. The invention includes a grade level box closed by a split cover plate assembly. A pedestal housing adapted for connection to the split cover plate provides an above-ground distribution enclosure containing interconnect hardware for making electrical connections to the transmission lines and/or devices contained in the grade level box.

BACKGROUND

Various electrical transmission lines and other equipment used for buried and underground utilities are commonly contained in enclosures that protect the underground wiring cables, fiber taps and splices, service lines, etc. from the environment. Initial construction often requires installation of such a below-ground enclosure, commonly referred to as a grade level box. At a later date, if service is to be provided to the premises, the cover for the grade level box is removed and connections are made inside an above-ground pedestal housing mounted on the grade level box. The above-ground connections are protected from the weather but also must be protected from vandalism and tampering. There is also a need to provide a pedestal housing assembly that can be readily installed and opened to facilitate further connections and/or service with minimal time and labor costs.

The present invention is applicable to any system for storing and protecting underground or buried electrical conductors and devices from the environment and for facilitating access to them when making further connections, providing service, making new installations, and the like. The invention is applicable to electrical utilities connections normally using buried or underground lines or connections such as cable TV, data transmission lines, various types of telecommunications, optical fiber connections, commonly referred to as "fiber to the premises," service lines, water meters, electrical power distribution, and other utilities equipment, for example.

One embodiment of the invention provides an optical fiber distribution and vault system for making service connections to optical fiber contacts initially contained in a grade level box. A multi-purpose cover assembly for the grade level box is adapted to accommodate a later installed pedestal housing which is used to bring the fiber taps and splices above ground.

The present invention provides an improved enclosure system that simplifies transition from initial installation to providing service to the premises, including (1) installation of a pedestal housing, (2) opening the pedestal housing for servicing the connections, or (3) providing an upgrade in service by replacing an existing pedestal housing. The invention, when compared with prior enclosure systems, reduces the parts required for making the transition, avoids discarding parts, and reduces time and labor costs in making new installations or changes to existing installations.

SUMMARY OF THE INVENTION

Briefly, one embodiment of the invention comprises a grade level box for underground utilities connections, comprising a substantially vertical wall structure extending continuously around an open region within the wall structure. The wall structure is made of a molded polymeric material and includes a vertically and horizontally extending supporting grid structure made of the molded polymeric material and integrally molded to an outer face of the vertical wall structure. The grid structure comprises horizontally spaced apart vertical ribs extending continuously from a lower to an upper portion of the vertical wall structure, and vertically spaced apart horizontal ribs extending continuously around the vertical wall structure. The vertical ribs enhance compression strength of the wall structure and the horizontal ribs provide improved resistance to side wall deflection under load bearing conditions.

These and other aspects of the invention will be more fully understood by referring to the following detailed description and the accompanying drawings.

BRIEF DESCRIPTION OF THE DRAWINGS

FIG. 5 is a side elevational view of a plug for the split cover.

FIG. 6 is a side elevational view taken on line 6-6 of FIG. 5.

DETAILED DESCRIPTION OF THE INVENTION

Figure 1:
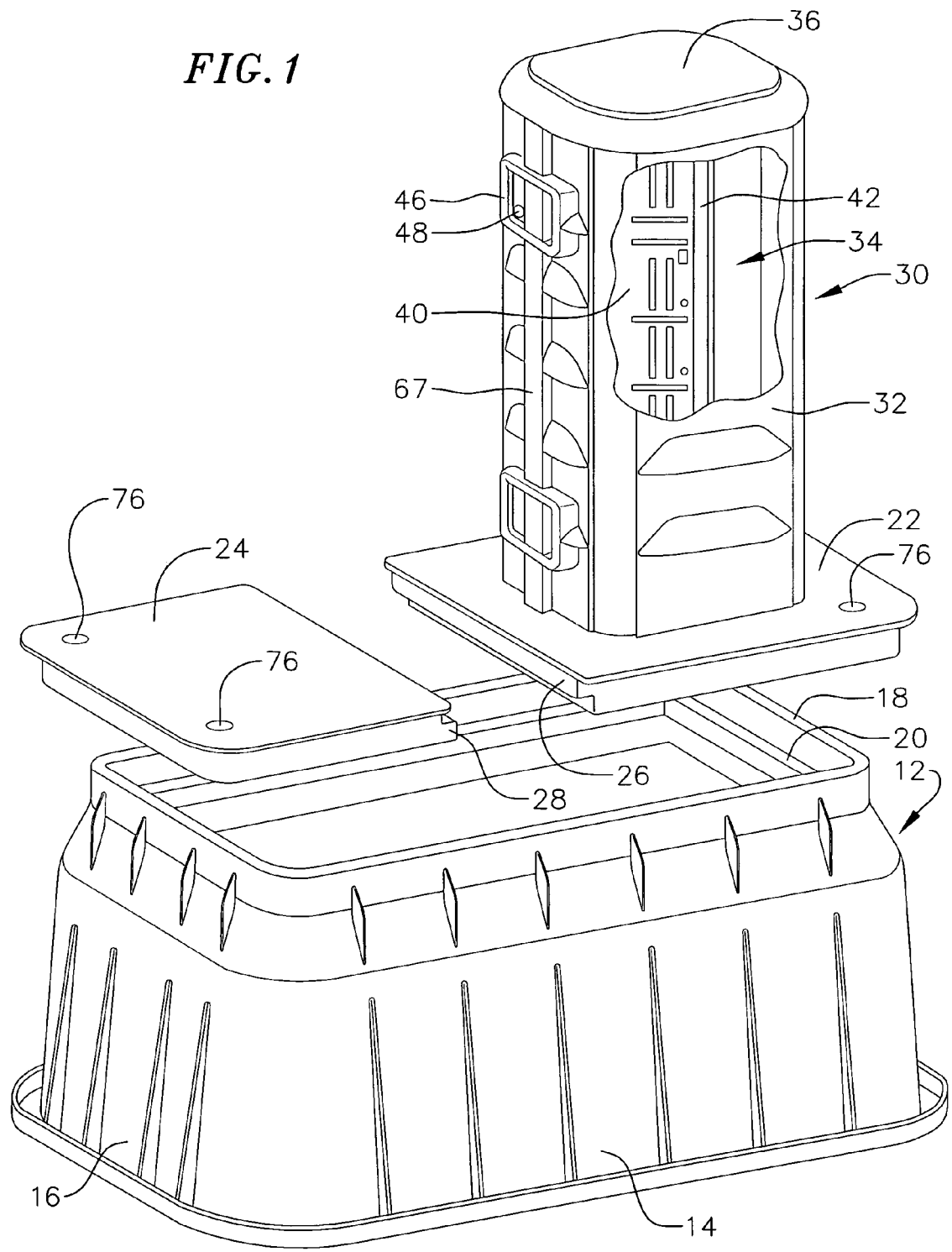
FIG. 1 is an exploded perspective view, partly broken away, showing one embodiment of an underground electrical utilities enclosure and distribution assembly according to principles of this invention.

FIG. 1 illustrates one embodiment of a pedestal housing assembly according to principles of this invention. The assembly includes an underground vault 12, also referred to as a grade level box. The grade level box is generally rectangular in configuration, having elongated parallel side walls 14 and shorter parallel end walls 16. The side and end walls are tapered narrower in an upward direction to enclose a hollow interior region within the box. The box is preferably made of hard plastic from a plastic molding process. The grade level box has an open bottom and an open top 18. In use, the grade level box is placed below ground level to contain underground electrical connections such as utility cables or conduits, data transmission lines, service lines, optical fiber cables and other underground utility devices, lines, or cables. These are referred to generally herein as electrical utility connections. The electrical connections go into the hollow interior of the grade level box through the bottom opening of the box. In use, the box is placed in the ground so its top is generally parallel with the ground level. The grade level box has a rim 20 spaced below the top opening 18 and the rim extends around the inside walls of the box to support a split cover plate.

The split cover plate is mounted to the open top of the box to cover the interior of the box. The split cover encompasses the entire exposed area at the top of the box to protect the interior of the box from the environment. The split cover is preferably in two side-by-side parts made of hard molded plastic, each generally in the shape of a flat narrow rigid panel or plate. The split cover comprises a pedestal section 22, which covers preferably more than half of the top opening of the box, and a cooperating cover section 24, which covers the remaining portion of the top opening in the box.

The two sections 22 and 24 of the split cover are supported on the rim 20 when the two part cover is positioned in the top opening of the box. The two cover sections are releasably interlocked along cooperating shoulders 26 and 28 on adjacent facing sides of the sections 22 and 24, forming a split that extends across the width of the two-part cover.

The pedestal section 22 of the split cover mounts a pedestal housing assembly 30. The pedestal housing protects the underground electrical utility connections when they are brought above ground for connecting to service lines from the customer, for example. The pedestal housing includes an upright pedestal cover 32 formed by a thin-walled housing structure having a hollow interior 34 with a closed top end 36 and an open bottom that communicates with the interior of the grade level box during use. (Communication is through an access opening in the pedestal section 32 described below.) The pedestal cover is preferably made of thin molded plastic and, in the illustrated embodiment, is of generally rectangular cross section although other cross sectional profiles may be used. The base of the pedestal cover is mounted over an access opening 38 (see FIG. 3) in the pedestal section 22 of the split cover.

Various mounting devices for making the electrical connections are contained within the pedestal cover 32. These can include a universal mounting plate 40, fiber splice mounting bars, terminal blocks, support blocks and the like. The universal mounting plate 40 may be rigidly affixed to an inverted U-shaped metal frame 42 (shown best at 42 in FIG. 8).

The inverted U-shaped frame 42 also may support a lock 44 (see FIG. 8) contained inside the pedestal cover. An outwardly projecting molded lock section 46 of the pedestal cover encloses the lock 44 when the pedestal cover is mounted in its fixed position over the U-shaped frame 42 and affixed to the pedestal section 22 of the split cover as shown in FIG. 1.

A locking device (not shown) having a key-operated latch (not shown) is affixed to the inside of the lock section 46 of the pedestal cover. When the pedestal cover slides down over the U-shaped frame 42, the interior locking device 44 engages the latch and automatically locks the pedestal cover 32 to the cover plate 22 when the pedestal cover reaches its fixed position. A key-operated lock 48 is located in the lock section 46 of the pedestal cover. A proprietary key (not shown) can be used to actuate the lock 48 to unlock the latch from contact with the interior lock 44 in order to remove the pedestal cover from the U-shaped frame 42.

Figure 2:
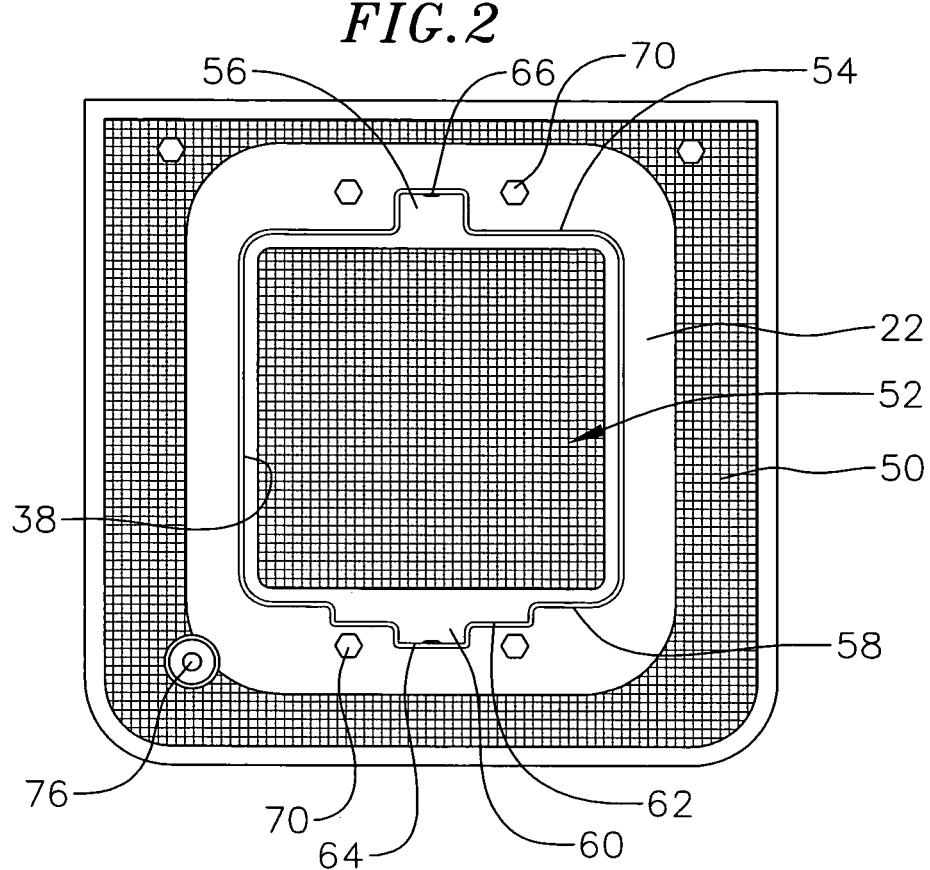
FIG. 2 is a top plan view showing a split cover pedestal mounting section containing a plug.
Figure 3:
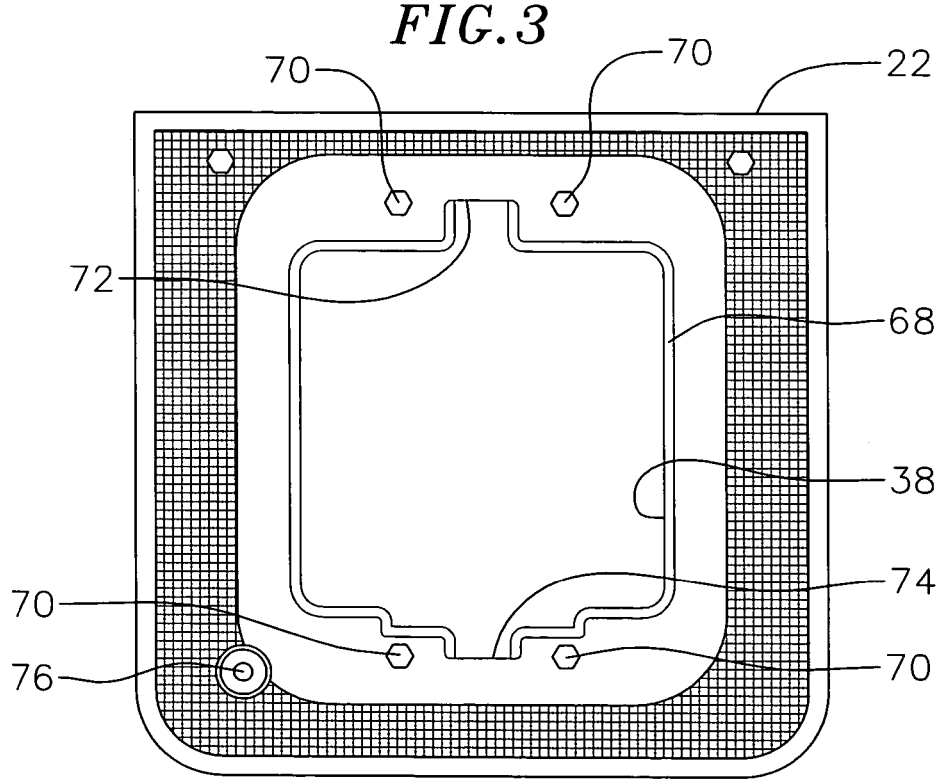
FIG. 3 is a top plan view similar to FIG. 2 but showing the plug removed.

FIGS. 1 through 3 illustrate one embodiment of a means for mounting the pedestal housing assembly to the pedestal section 22 of the split cover plate. In this embodiment, the pedestal section 22 contains the access opening 38, also referred to as a plug opening. The opening 38 has a profile that matches the configuration of the opening at the bottom of the pedestal cover 32.

FIG. 2 shows the split cover plate 22 in a use position for covering the access opening 38 in the pedestal section 22. The pedestal section 22 and the adjacent cover section 24 of the split cover each have a traction surface 50. In this embodiment, a removable plug 52 is disposed in the access opening 38 in the pedestal section 22 of the split cover. The top surface of the plug 52 has a traction surface at ground level generally in the same plane as the tractioned top surfaces of the split cover sections 22 and 24. This provides a continuous top surface at ground level for the grade level box prior to installation of the pedestal housing. When the pedestal housing is to be installed in the pedestal section 22 of the split cover, the plug 52 is removed from the access opening 38 to provide access between the electrical utility connections in the grade level box and contacts to be mounted within the pedestal housing.

The plug comprises a thin flat plate made of hard molded plastic. The outer edge of the plug has a complex profile that matches the configuration of both the access opening 38 and the configuration at the bottom opening of the pedestal cover 32.

The plug 52 has a generally rectangular configuration with rounded corners. Opposite ends of the plug have outwardly projecting profiled sections which are shaped differently from each other.

One end 54 of the plug has a narrow generally rectangularly shaped projection 56. This portion of the plug is shaped to generally match the configuration of an upright channel 67 (see FIG. 1) molded into a side of the pedestal cover 30 to accommodate one side leg of the U-shaped mounting frame when the cover fits over the frame. The other end 58 of the plug has a projecting section of more complex configuration which includes a generally rectangularly shaped shallow projection 60 centered in a wider and shallow projecting section 62 on opposite sides of the projection 60. The end 64 of the projection 60 is spaced from the end 58 of the plug by a distance substantially equal to the distance between the end 66 of the projection 56 and the end 54 of the plug. The complex profile of the projecting regions 60 and 62 is shaped to generally match the configuration of a complex channel molded into a side of the pedestal cover 30 to accommodate an opposite side of the U-shaped frame 42 when the cover fits over the frame. In this instance, the widened projecting section 62 accommodates the lock mechanism 44 mounted to one side of the U-shaped frame 42. The narrower section 62 is shaped to match the configuration of the upright channel 67 molded into a side of the pedestal cover to accommodate the other side of the U-shaped frame.

When placing the pedestal cover over the U-shaped mounting frame, the matching profiles on opposite sides of the pedestal cover are aligned with their respective profiles at the access opening 38 in the pedestal section 22. The pedestal cover then can slide down over the U-shaped frame and interconnect at the bottom with the profiled access opening.

FIG. 3 shows the pedestal section 22 with the plug 52 removed from the access opening 38. This view illustrates a rim 68 of complex profile which extends around the inside of the plug opening 38 to provide a means of support for the plug 52 when the plug is removably mounted in the opening 38. This rim also supports the bottom of the pedestal cover when the cover is positioned in the access opening 38. As shown best in FIG. 3, the notched regions at opposite ends of the access opening 38 match the configurations of the projecting regions at their corresponding end portions of the access opening 38.

FIGS. 2 and 3 also show fastener openings 70 adjacent projecting end portions of the plug. These can be used in one embodiment of the pedestal in which the bottoms of the U-shaped frame 42 have metal feet (not shown) that fasten to the underside of the pedestal cover section 22. In this instance, fasteners (not shown) extend through the openings 70 for securing the feet to the cover section. The legs on opposite sides of the U-frame are contained within notched regions 72 and 74 on opposite sides of the plug opening 38.

In use, the embodiment of FIGS. 1 through 3 can normally be assembled with the split covers at ground level covering the top opening of the grade level box. Fasteners (not shown) located in openings 76 at the corners of the split cover plates can be used to secure the cover plates against tampering or vandalism. These fasteners may extend through cooperating locking shoulders formed in the corners inside the grade level box.

The split cover plate provides sufficient rigidity to accommodate foot traffic at ground level when the top of the box is closed by the split cover plates and the plug. When service is to be provided by installing the pedestal housing, the split cover plate section 24 is removed by loosening the fasteners at the corner of the cover plate to gain access to the interior of the grade level box. This also provides a means for gaining access to any connectors at the base of the plug that hold the plug in place in the access opening of the pedestal section 22. Removing the plug provides access to the grade level box (through the access opening 38) for the pedestal housing. The pedestal section 22 of the cover plate can be removed and the U-shaped frame can be affixed to the cover plate. Connections can be made to the various connection devices on the universal frame or other connecting means contained in the pedestal housing. Once the connections are made, the pedestal cover is positioned over the opening 38 in the cover plate 22. Placing the pedestal cover over the U-shaped frame and sliding it downwardly automatically engages the locking devices to lock the pedestal cover in place. The cover plate 24 at the other side of the box then can be placed back in its position on top of the opening in the grade level box and fastened in place with the fasteners which (in the embodiment of FIG. 1) are located at the corners of the cover plate.

Figure 4:
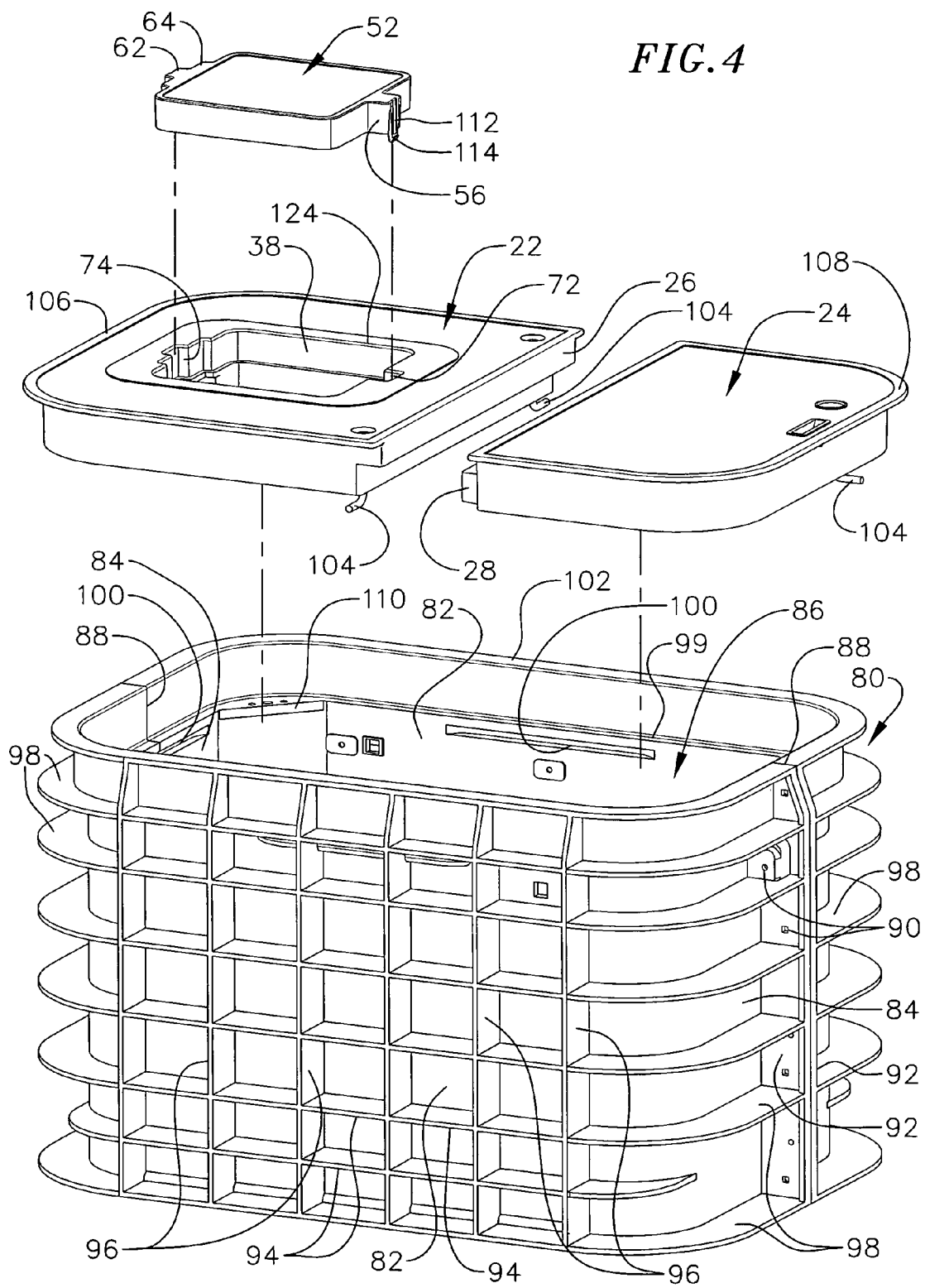
FIG. 4 is an exploded perspective view showing another embodiment comprising a grade level box, a split cover and a removable plug.
Figure 7:
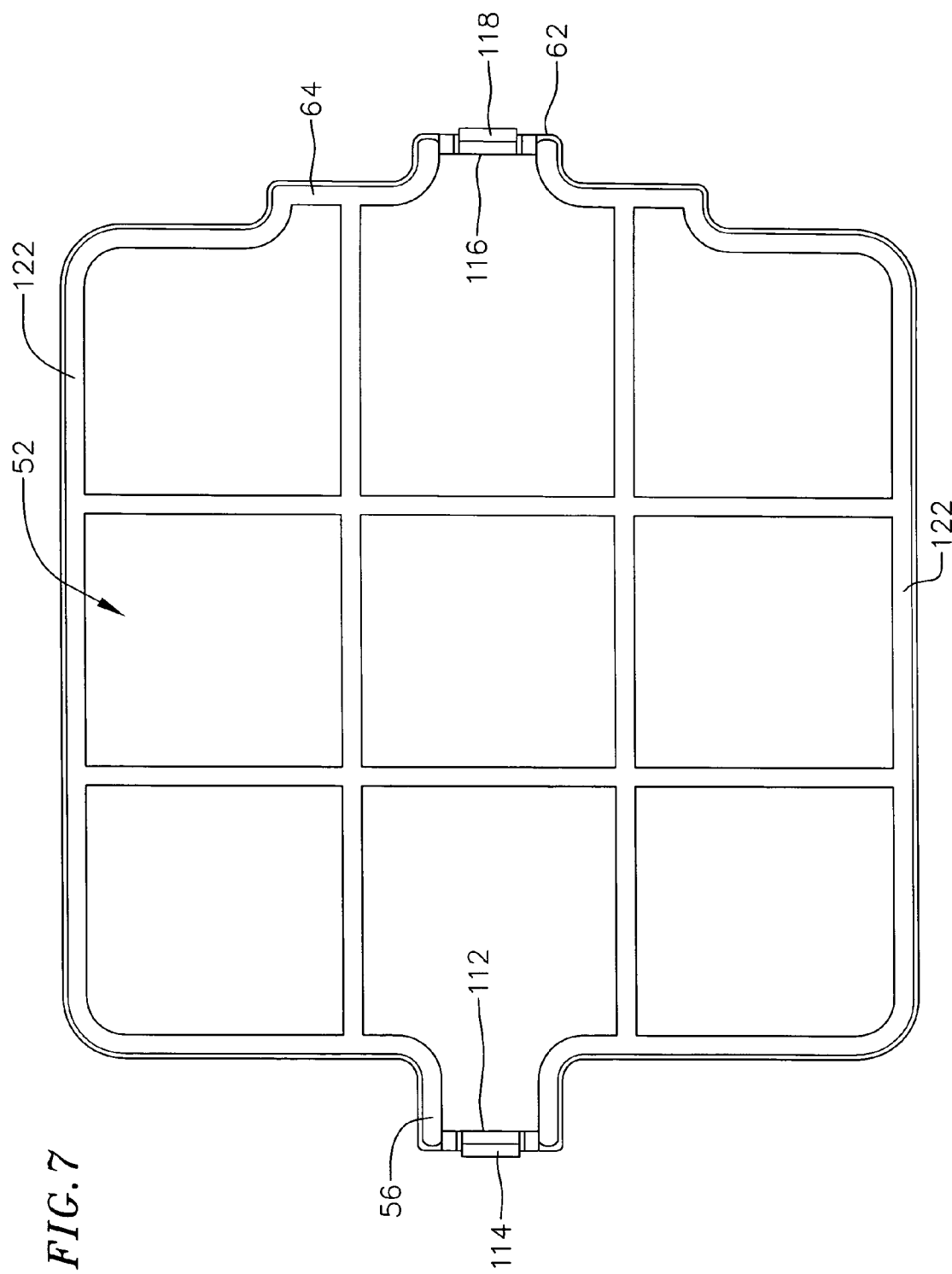
FIG. 7 is a bottom elevational view taken on line 7-7 of FIG. 6.
Figure 8:
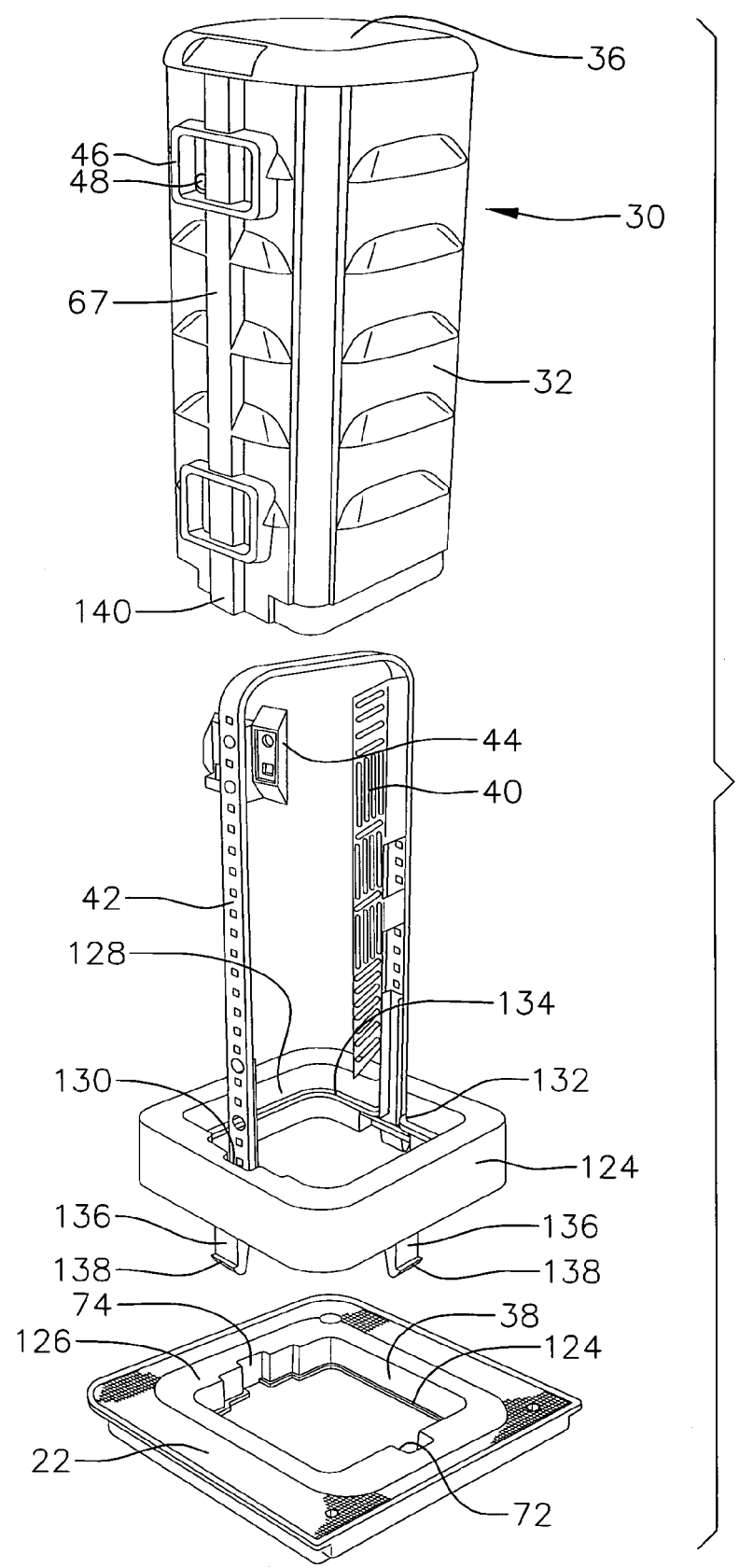
FIG. 8 is an exploded view showing a split cover, a collar, an upright utility conduit connection frame and locking device, and a pedestal housing cover for the assembly shown in FIG. 9.
Figure 9:
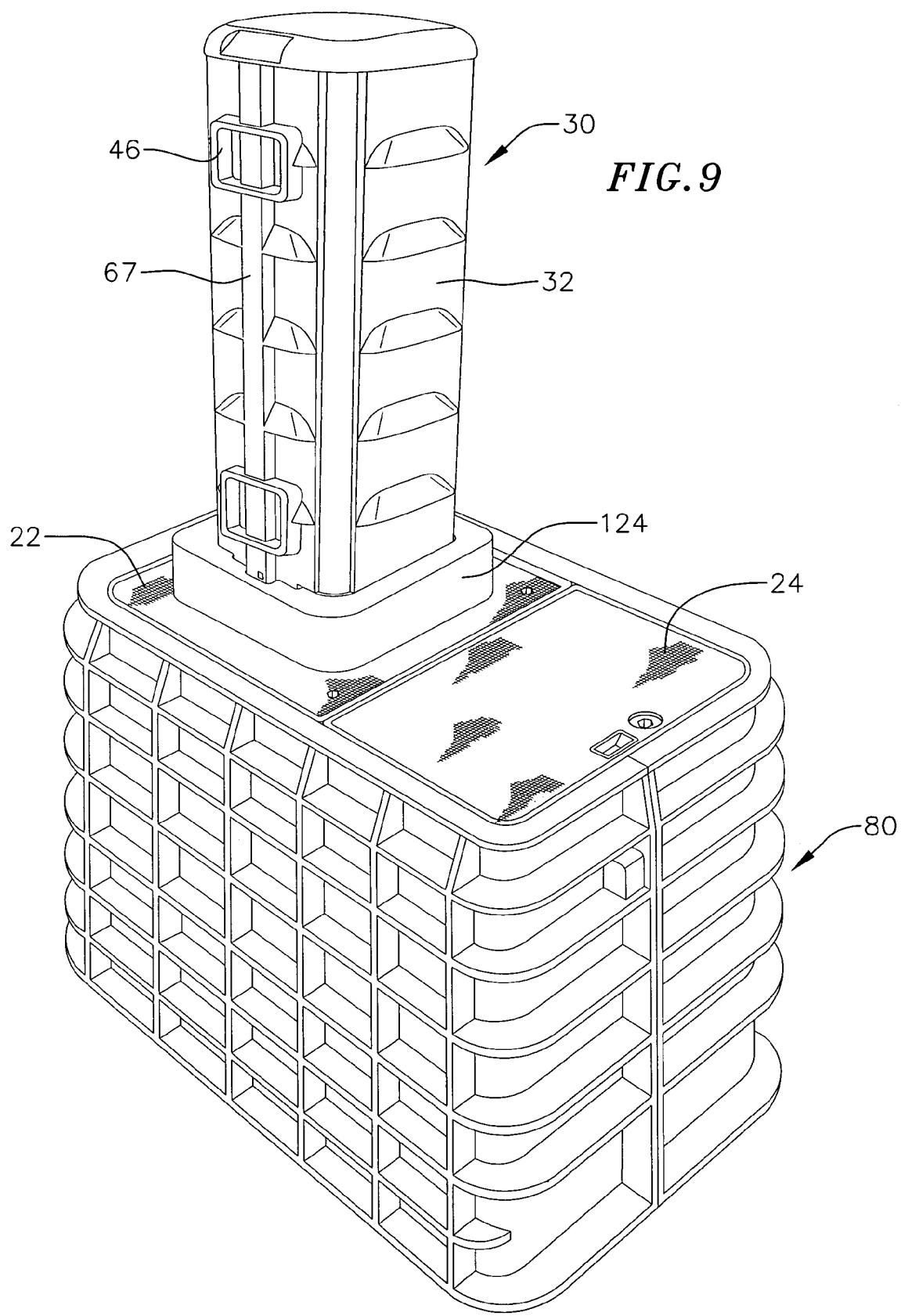
FIG. 9 is a perspective view showing an assembled combination of a grade level box, a collar mounted on a split cover, and a pedestal housing cover.

FIGS. 4 through 9 illustrate an alternative form of the invention. FIG. 4 is an exploded perspective view illustrating an alternative embodiment of the grade level box, together with the split cover plates and a plug that covers the opening in one cover plate prior to installation of the pedestal housing assembly. FIGS. 5 through 7 illustrate details of the plug which is similar to the plug shown in FIGS. 1 and 2. FIG. 8 is an exploded perspective view illustrating component parts of an alternative embodiment of the pedestal housing assembly. FIG. 9 is a perspective view illustrating the pedestal housing in its assembled form installed on the split cover plate atop the grade level box.

FIG. 4 illustrates an alternative grade level box 80 having a pair of long parallel side walls 82 and a pair of shorter end walls 84, forming a generally rectangular structure having a hollow interior. The grade level box has an open bottom and an open top 86 for receiving the split cover. In this embodiment the grade level box has vertically disposed side walls and vertically disposed end walls, forming top and bottom openings enclosing substantially the same area. The box is made of hard molded plastic and is molded in halves, split along its longitudal center axis into two parts, forming a seam 88 at each end. The two halves are rigidly fastened together along the seams at each end by fasteners 90 extending through upright flanges 92 which face each other along each seam. The grade level box also has a molded integrally formed grid structure facing outwardly along each side wall. The grid structure is formed by long horizontal flanges 94 and vertical uprights 96 forming are essentially rectangular array. The horizontal flanges wrap around the ends of the box at 98. This construction of the grade level box provides good compressive strength to resist vertical loads on the walls of the box. The load resistance has been shown to far exceed the load resistance of a box having tapered end walls and side walls such as the box 12 shown in FIG. 1.

The interior of the grade level box includes narrow elongated recessed slots 100 extending parallel to the top edge of the box. The slots are formed generally along a central region of each side wall and each end wall. The slots are spaced below a rim 102 which extends around the top edge of the box. The slots are used for interlocking with a cover plate locking device 104 (described in more detail below) when the cover plates 22 and 24 are positioned atop the box. The pedestal section 22 of the cover plate has an outwardly projecting rim 106 which rests on the rim 102 of the grade level box when the cover plate section 22 is mounted to the top of the box. The adjacent cover plate section 24 has an outwardly projecting rim 108 which rests on the remaining portion of the rim 102 when the cover plate section 24 is positioned in the opening of the box adjacent the pedestal section 22. The interior of the box also includes a separate flat angled supporting flange 110 in each corner. The flanges are used to support the bottom edges of the split cover plate sections 22 and 24 when the cover plates are installed in the opening of the box.

Figure 4A:
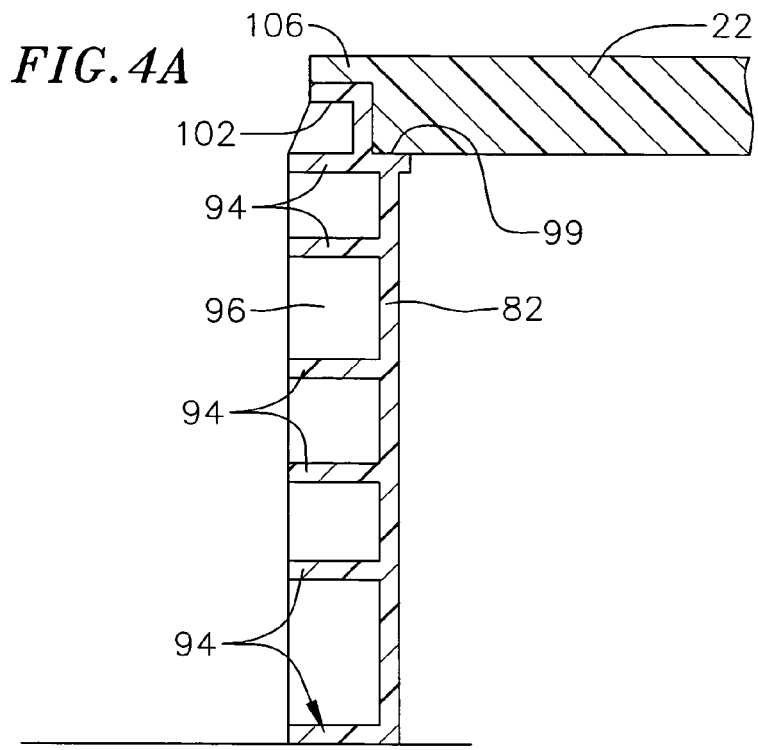
FIG. 4A is a cross-sectional view illustrating compression load bearing capacity provided by the grade level box.

As shown in FIG. 4, the grade level box has a recessed rim 99 extending around the inside of the box for use in supporting a bottom edge of the cover plate, similar to the rim 20 of the enclosure shown in FIG. 1. The side walls 82 and walls 84 extend continuously vertically from the bottom to the top of the grade level box. The integrally molded vertical ribs 96 also extend continuously from bottom to top of the box. The continuous vertical rib design and continuous wall structure increases the enclosure's compressive strength and load bearing capacity. The horizontal flanges 94 provide lateral support for the walls and the vertical ribs which increases resistance to deflection of the box side walls during use. As shown in FIG. 4A, during use, the cover plate rests on the rim 99 that spans inside of the box. The vertical side walls 82 and 84 supported by the integrally molded rib structure provide the effect of an I-beam that supports the weight of the cover plate for the full vertical height of the enclosure side walls.

Figure 4B:
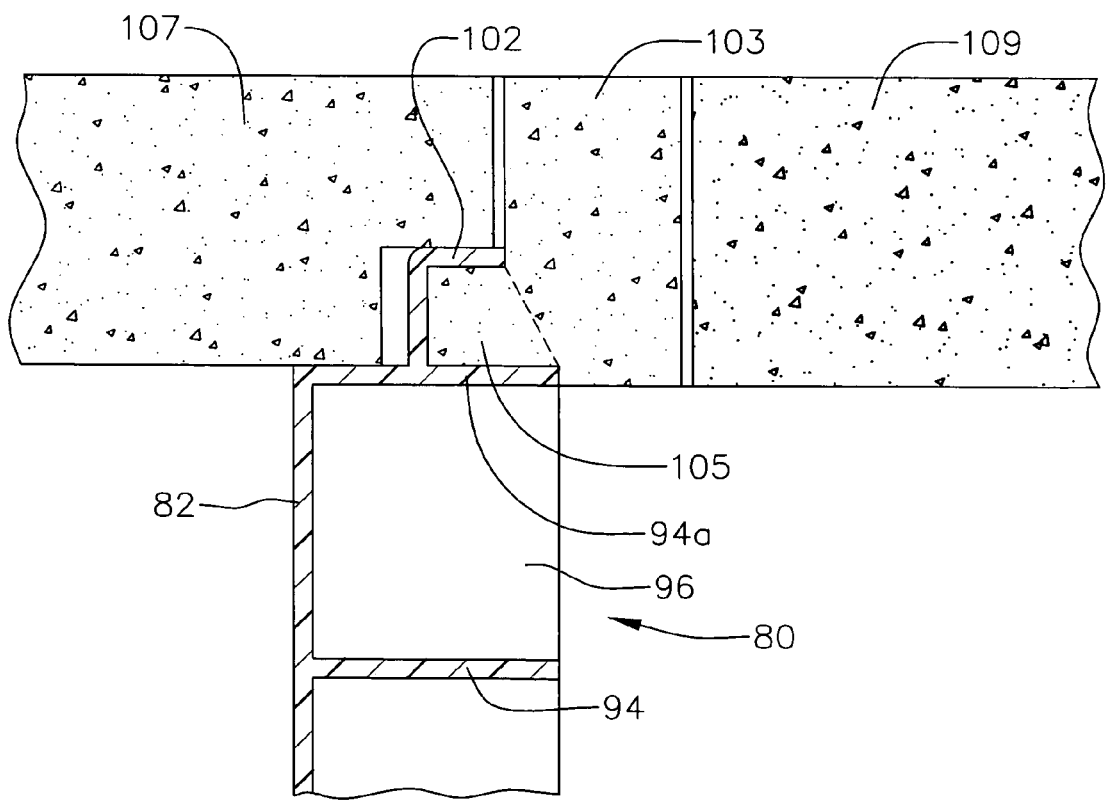
FIGS. 4B and 4C are cross-sectional views illustrating alternative embodiments of a polymer-concrete ring and cover plate for use in sidewalk applications.
Figure 4C:
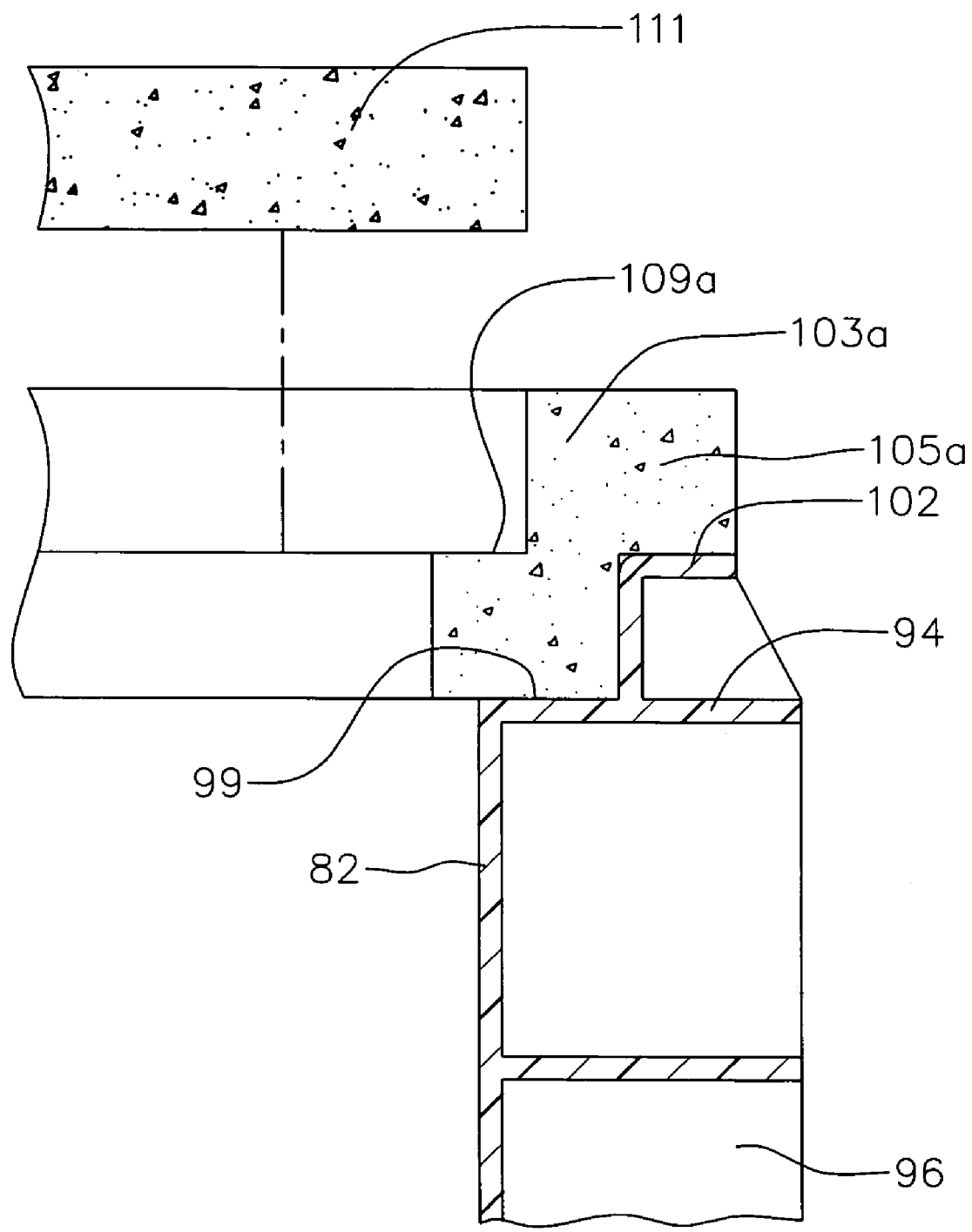

FIGS. 4B and 4C illustrate alternative uses of the grade level box. In these instances, the grade level box is used in sidewalk applications which can require high load bearing capacities. FIG. 4B shows one embodiment of a sidewalk application using a polymer-concrete ring 103 that encircles the outer periphery of the grade level box. The ring has an inner section 105 that rests on an upper horizontal section 94a of the grade level box. This portion of the ring can be profiled to interlock with the vertical ribs in this area of the box. The rest of the ring spans the area above and around the box. An interior opening in the ring seats a polymer-concrete cover 107 having an outer section profiled to rest on the upper edge 102 of the box. The assembly is positioned below ground for receiving and supporting the utility connections as described herein. The box can be positioned below ground in an opening below a sidewalk 109 with the upper surface of the cover and ring being aligned with the level of the sidewalk.

FIG. 4C illustrates another alternative use for sidewalk applications in which a polymer concrete ring 103a encircles the upper portion of the grade level box and rests on the top edge 102 of the box. The top of the ring 103a has an outwardly projecting flanged section 105a that rests on the top edge 102 of the box. A downwardly projecting recess in a ring section 107a of the ring 103 rests on the upper surface of the inside rim 99 of the grade level box. The upper interior region of the opening in the ring is recessed at 109a to receive a polymer-concrete cover plate 111. The cover plate can be continuous with the open area within the ring or it can be a split cover plate as described herein.

The grade level box embodiments of this invention as mentioned provide high static vertical load bearing capacities. In one embodiment, the polymer-concrete cover and ring provide sidewalk/driveway static load bearing capacities of 20,000 pounds; the split plastic cover plate embodiment in combination with grade level box provides static load capacities of 8,000 pounds; and a solid one-piece plastic cover plate used with the grade level box has a static load bearing capacity of 10,000 pounds.

FIGS. 4 through 7 illustrate detailed construction of the plug 52. Each projecting end section of the plug has connecting devices for mounting the plug in the access opening 38 without separate fasteners. The plug mounts in a friction fit in which the connectors releasably snap lock into opposite sides of the access opening 38. The projecting end section 56 has a downwardly extending bendable clip 112 with an outwardly facing detent 114 at the bottom of the clip. On the opposite side of the plug the projecting end section 62 has a similar downwardly extending bendable clip 116 with an outwardly facing detent 118 at the bottom of the clip.

FIGS. 5, 6 and 7 illustrate the plug which is disposed in the opening 38 of the cover plate section 22. The bendable clips at both ends bend inwardly so the detents can slide past and snap-lock into locked positions on bottom edge portions 120 of the plug opening. A bottom edge 122 of the plug rests on the rim 68 that spans the bottom inside of the plug opening. When the plug 52 is snap-locked into its fixed position in the pedestal section 22 of the cover plate, the plug cannot be removed from the plug opening by above-ground access. Access is provided by either removing the cover plate section 24 or removing the pedestal section 22 of the split cover plate.

FIG. 8 shows a pedestal housing assembly that mounts to the pedestal section 22 of the cover plate shown in the embodiment of FIG. 4. The pedestal housing assembly includes a generally rectangular collar 124 made of hard molded plastic and shaped to fit around the access opening 38 when the collar is positioned to rest on a peripheral section 126 of the cover plate top surface. The collar has a generally rectangular interior opening 128 that substantially matches the configuration of the access opening 38 when the collar rests atop the plate section 22. The collar supports the pre-assembled U-shaped mounting frame 42. The bottom legs of the U-shaped frame are rigidly affixed to recessed inside portions of the collar opening. One side 130 of the collar opening is configured to match the configuration of the notched portion 74 of the cover plate opening 38. The other side 132 of the collar opening is configured to match the configuration of the notched portion 72 of the cover plate opening. FIG. 8 shows the bottom legs of the U-shaped frame disposed in these notched regions of the collar inside wall.

The collar 124 also includes an inwardly projecting rim 134 that seats the bottom of the pedestal cover 32 when the cover slides over the U-shaped frame 42 and into the collar opening. The collar further includes separate downwardly projecting bendable clips 136 each with a bottom end detent 138 similar to the clips on the plug 52. These bendable clips are each integrally formed with and project downwardly from a central portion of each side of the collar, the separate clips facing outwardly from the bottom sides of the collar.

In use, the collar is positioned on the top surface region 126 of the cover section 122 to force the detent portions 138 of the clips 136 into an interlocking engagement under the rim 124 at the base of the opening 38. The clips or other connectors can be of various configurations and located in different positions on the collar for use in snap locking the collar into a fixed position on the cover plate 22. The connectors releasably fasten to the cover plate in a friction fit without the need for separate fasteners. The clips 136 can be configured to position the collar and the U-frame 42 over the cover plate section 22 in the alignment shown in FIG. 8, or alternatively, the clips 132 can be arranged on the base of the collar so as to engage the notched portions 72 and 74 at opposite ends of the cover plate section 22 in an alignment rotated 90° (clockwise) with respect to the positioning shown in FIG. 8.

With the collar 124 positioned on the plate section 22, access is provided to the interior of the grade level box through the opening 128 in the collar and the aligned opening 38 in the cover plate section 22. Access also can be provided by removing the adjacent section 24 of the split cover plate. Once the electrical connections are made between the underground electrical cables service lines, etc. and contacts mounted on the universal mounting plate 40, for example, the pedestal cover 32 then can slide downwardly over the U-frame 42. The pedestal cover 32 is positioned over the U-frame in the alignment shown in FIG. 8 so that the outwardly projecting sections 46 and 67 of the pedestal cover can slide around the lock 44 and the legs of the U-frame. Lower base regions 140 on opposite sides of the pedestal cover are configured to match the notched regions 130 and 132 of the collar opening, so that when the pedestal cover slides to its locked position, the base regions 140 of the pedestal cover are interlocked with the inside notched portions of the collar. This secures the pedestal cover to the collar. The latch portion of the key carried on the inside of the pedestal cover engages the lock 44 when the pedestal cover slides down over the U-frame. This automatically locks the pedestal cover against removal when the pedestal cover reaches its fixed position in the collar. The opposite legs of the U-frame 42 are disposed in the projecting portions 67 of the pedestal cover when the cover is in its locked position. A special key (not shown) then can be used to remove the cover 32 by actuating the lock 48 on the pedestal cover.

FIG. 9 shows the assembled position of the pedestal cover and collar on the split cover plates mounted to the grade level box.

Figure 10:
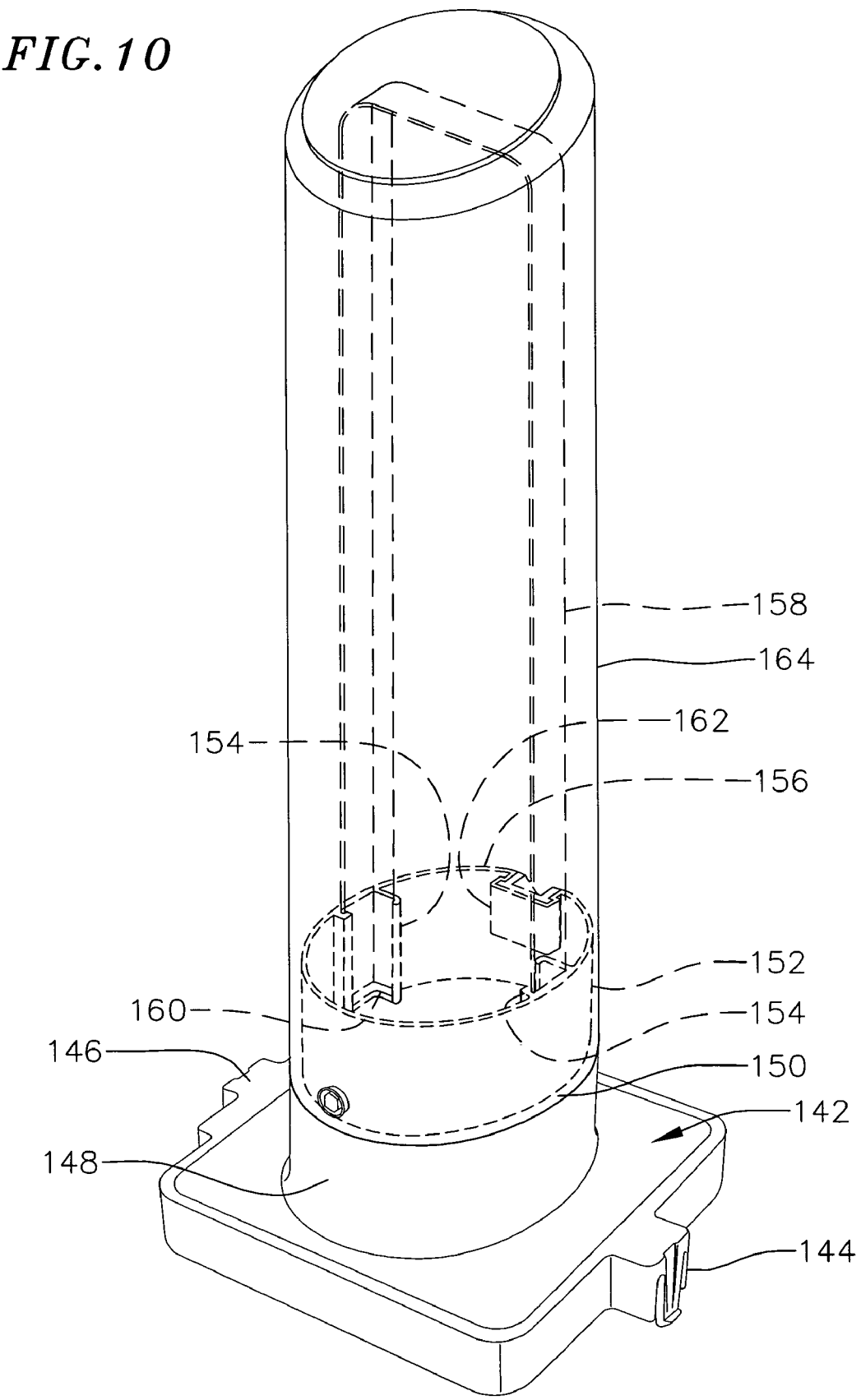
FIG. 10 is a perspective view showing an assembled form of another alternative form of the invention comprising an integral plug base and collar and a removable pedestal housing cover.
Figure 11:
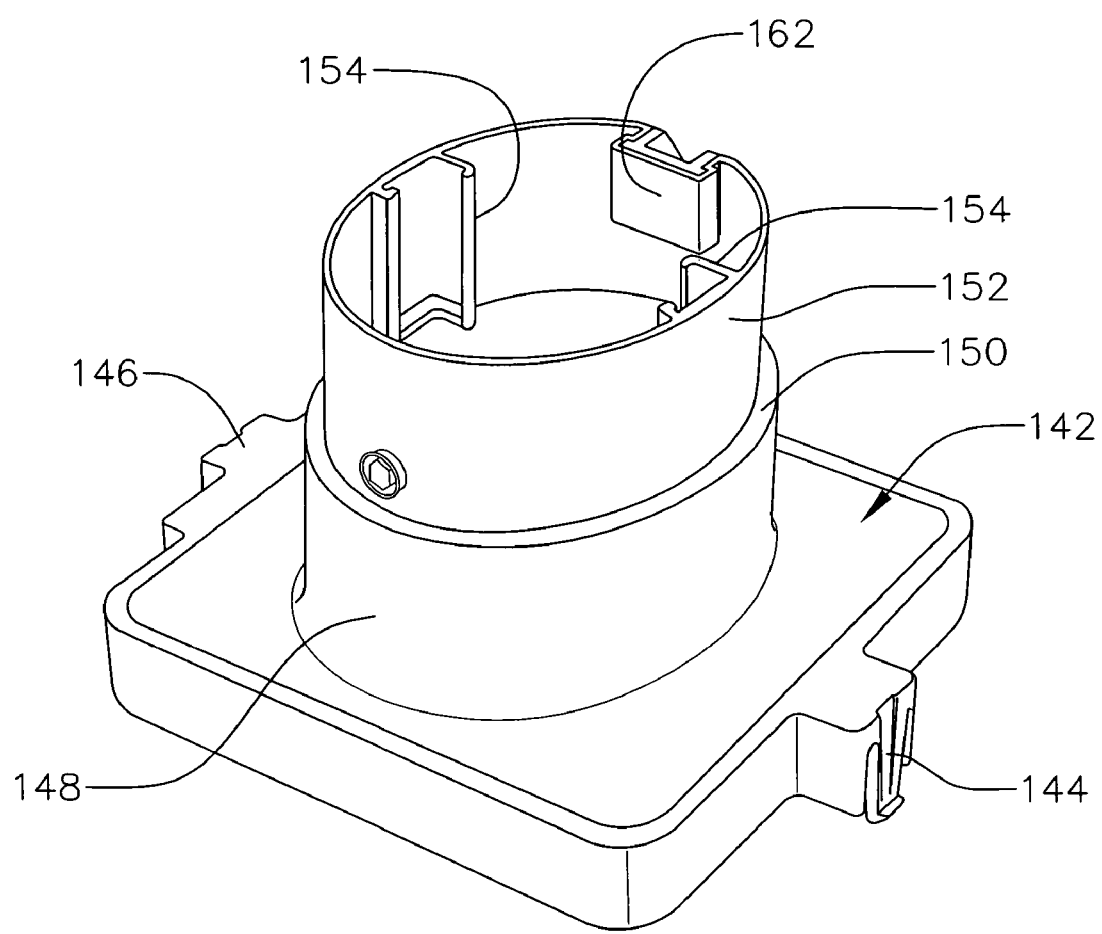
FIG. 11 is a perspective view showing the integral plug base and collar assembly of FIG. 10.

FIGS. 10 and 11 show another embodiment of the invention in which a collar and pedestal cover housing are mounted to a generally rectangular base 142 configured for removable mounting in the opening 38 of the split cover plate section 22. In this embodiment the base 142 is made of hard molded plastic and configured similar to the plug 52. The base has a flat upper surface with outwardly projecting end sections 144 and 146 with bendable clips. The projecting end sections match the configuration of the notched regions 72 and 74 at opposite ends of the opening 38 in the pedestal section 22.

The base 142 includes an integrally molded collar 148 projecting upwardly from the top surface of the base 142. The collar is a thin wall structure of any desired configuration. In the illustrated embodiment the configuration is oval in shape. The collar spans the peripheral portion of an opening of matching configuration in the base, for access to the interior of the grade level box during use. The collar has a recessed rim 150 extending around its outer circumference below an oval shaped upper section 152 of reduced size. The opposite inside walls of the upper section 152 have molded channel sections 154 that open upwardly along a top edge 156 of the upper collar section. These channel sections provide rigid support for an inverted U-shaped frame 158 which extends above the collar 148. The bottom portions of the U-frame 158 slide into the channels 154 and each rests against a separate shoulder 160 at the bottom of each channel section. The collar also includes a molded recessed structure 162 that provides one portion of a lock that engages a corresponding portion of a lock affixed to the inside of a pedestal cover 164 that slides down over the collar upper portion 152 during use.

In using the pedestal assembly mounting base 142, the plug-shaped base 142 is disposed in the access opening of the pedestal section of the split cover plate. The clips on the projecting end sections 144 and 146 are snap-locked into place in the notched ends of the cover plate opening to affix the base 142 so its top surface is continuous with the cover plate sections on the grade level box. The split cover plate on the other side of the grade level box can be removed to provide access to the electrical cable and service lines below ground to draw them upwardly into the interior of the collar. The U-frame 158 is attached to the collar to provide a means of mounting connections inside the pedestal assembly. When the connections are completed the oval shaped pedestal cover 164 slides down over the U-shaped frame and into contact with the rim 150 that extends around the collar. A lock carried on the inside of the pedestal cover can snap lock into locking engagement with the lock carried on the U-frame.

The split cover plates are preferably locked and unlocked by a one-piece locking device 104 in the form of an "L-bolt." This locking device is described in more detail below. In use, the cover plates are assembled on the top of the grade level box by placing the cover section 24 on one side of the box and locking the L-bolt at the end of the plate section (see FIG. 4). The L-bolt on the plate section is rotated to an unlocked position and then rotated to its locked position to move a right-angle leg at the bottom of the bolt into one of the slotted openings 100 in the box. The pedestal mounting section 22 is then placed on top of the box (interlocking the shoulders 26 and 28) and the L-bolts at the front corners of plate section 22 are locked to the slotted openings in the sides of the box. The end portion of the plate section 22 remote from the L-bolts may contain a molded hinge to interlock with an adjacent slotted opening or it may contain another L-bolt.

In one embodiment, the L-bolt locking assembly is used for locking a lid to a hollow enclosure in which the enclosure has a locking surface on an inside wall of the enclosure. The locking assembly is disposed in and located adjacent an edge of the lid for cooperating with the locking surface inside the enclosure. The locking assembly includes an L-bolt rotatably disposed in the lid, the L-bolt rotatable between an unlocked position and a locked position, the L-bolt extending through a passage in the lid and having (1) a locking projection located on an underside of the lid and (2) a position adjusting device exposed to the upper surface of the lid. The locking assembly further includes a locking piece that fits into the passage around the L-bolt to prevent removal of the L-bolt from the lid, once the L-bolt is positioned in the lid. The L-bolt in its unlocked position allows the lid to fit into a closed position on the enclosure. The L-bolt is rotatable to its locked position by rotating the position adjusting device atop the L-bolt to thereby rotate the L-bolt, and therefore the locking projection, under the locking surface inside the enclosure so that the locking projection can prevent removal of the lid from the enclosure.

In another embodiment, the L-bolt locking system is used for closing and locking a lid on an enclosure such as a grade level enclosure. The locking system includes a latch formed on an edge of a lid of the enclosure. The latch includes a bolt recess on an upper face of the lid which opens into a slotted wall structure that forms a passage below the lid. The bolt recess has a slotted opening which receives an L-bolt that extends down into a hollow interior of the slotted wall structure. A right angle leg on the L-bolt protrudes below the slotted wall structure when a fastener head atop the L-bolt rests in the bolt recess. The fastener head of the bolt in its at-rest position in the bolt recess provides a means of access for use in rotating the L-bolt (and its right angle leg) with a tool that fits into the bolt recess to engage the fastener head. With the right angle leg of the L-bolt rotated to an axially aligned position, a separate locking piece is driven into the interior of the slotted wall structure from beneath the lid during the assembly process. The L-bolt can be rotated to rotate the right angle leg to an open position so the lid can be closed on the enclosure. The L-bolt can be rotated back to a position in which it locks the lid to the enclosure. The bottom leg of the L-bolt, when rotated to its locked position, protrudes under a locking surface inside the enclosure. This releasably locks the lid to the enclosure. The locking piece inserted into the slotted wall structure beneath the lid holds the L-bolt in place and prevents its removal from the bolt recess.

For initial installations (without the pedestal) the plug 52 can be inserted into the opening 38 in plate section 22 to provide a flat top surface at ground level. The plug is positioned in the locked split cover plate without the need for extraneous fasteners or locking devices.

When opening the grade level box, either side of the split plate can be unlocked and removed to gain access to the fastener clips on the underside of the plug. With the plug removed, the pedestal housing assemblies (described above) can be positioned in the cover plate section 22, electrical connections can be made and the pedestal cover locked in place when connections are completed. No fasteners or other parts are required to mount the pedestal contact support structure in the access opening or to connect the pedestal cover over the upright support structure.

What is claimed is:

1. A grade level box for underground utilities connections comprising:
    a substantially vertical wall structure extending continuously around an open interior region within the wall structure, the wall structure made of a molded polymeric material,
    a vertically and horizontally extending supporting grid structure made of a molded polymeric material and integrally molded to an outer face of the vertical wall structure, the grid structure comprising horizontally spaced apart vertical ribs extending continuously from a lower to an upper portion of the vertical wall structure, and vertically spaced apart horizontal ribs extending continuously around the vertical wall structure, including a concrete-containing ring adapted to be supported on an upper edge of the vertical wall structure of the grade level box, the ring having an interior opening adapted for alignment with the open interior region within the grade level box,
    in which an inside section of the ring is profiled to support a cover which optionally can be made from a concrete-containing material.

2. An underground utilities enclosure and distribution assembly comprising:
    a grade level box adapted for installation below ground and having an upper opening facing an interior region for containing a below-ground electrical utility cable,
    a removable cover plate adapted for mounting to the opening in the grade level box to close off at least a portion of the interior region thereof from the environment, the cover plate comprising a pedestal mounting section; and
    a pedestal housing adapted for attachment to the pedestal mounting section and providing above-ground access to the interior region of the grade level box,
    the grade level box comprising a substantially vertical wall structure extending continuously around the interior region within the wall structure, the wall structure made of a molded polymeric material, and a vertically and horizontally extending supporting grid structure made of a molded polymeric material and integrally molded to an outer face of the vertical wall structure, the grid structure comprising horizontally spaced apart vertical ribs extending continuously from a lower to an upper portion of the vertical wall structure, and vertically spaced apart horizontal ribs extending continuously around the vertical wall structure.

3. Apparatus according to claim 2 including a recessed rim projecting into and around the interior region of the box and formed above an inside portion of the vertical wall structure, so that the cover plate resting on the rim is supported by the vertical wall structure.

4. Apparatus according to claim 2, in which the wall structure is split into at least two parts to form a seam, and including upright abutting flanges integrally molded to the wall structure along the seam, and fastening means extending through the abutting flanges for securing opposite sides of the wall structure together as a rigid unit.

5. Apparatus according to claim 4, in which the wall structure is split longitudinally into two parts to form vertical seams along each end of the wall structure, and in which said abutting flanges are formed along each vertical seam.

6. An underground utilities enclosure and distribution assembly comprising:
    a grade level box adapted for installation below ground and having an upper opening facing an interior region for containing a below-ground electrical utility cable,
    a removable cover plate adapted for mounting to the opening in the grade level box to close off at least a portion of the interior region thereof from the environment, the cover plate comprising a pedestal mounting section; and
    a pedestal housing adapted for attachment to the pedestal mounting section and providing above-ground access to the interior region of the grade level box,
    the grade level box comprising a substantially vertical wall structure extending continuously around the interior region within the wall structure, the wall structure made of a molded polymeric material, and a vertically and horizontally extending supporting grid structure made of a molded polymeric material and integrally molded to an outer face of the vertical wall structure, the grid structure comprising horizontally spaced apart vertical ribs extending continuously from a lower to an upper portion of the vertical wall structure, and vertically spaced apart horizontal ribs extending continuously around the vertical wall structure, and a recessed rim projecting into and around the interior region of the box and formed above an inside portion of the vertical wall structure, so that the cover plate resting on the rim is supported by the vertical wall structure,
    in which the upper opening of the box faces the interior region, and in which the removable cover plate for said upper opening rests on the rim and is supported by the vertical wall structure.

7. Apparatus according to claim 6, in which the box has a bottom opening for receiving a below-ground electrical utility cable within the interior region of the box.

8. Apparatus according to claim 7, in which the box is positioned in an opening in the ground, in which a below-ground electrical utility cable is contained within the interior region of the grade level box, and in which the cover plate is positioned in substantial alignment with ground level.

9. An underground utility enclosure assembly comprising:
    a grade level box for installation below ground with an opening facing an interior region for containing a below-ground electrical utility cable,
    a removable cover plate for mounting over the opening in the grade level box to close off at least a portion of the interior region thereof from the environment,
    the grade level box comprising a substantially vertical wall structure extending continuously around an open region within the wall structure, the wall structure made of a molded polymeric material, and a vertically and horizontally extending supporting grid structure made of a molded polymeric material and integrally molded to an outer face of the vertical wall structure, the grid structure comprising horizontally spaced apart vertical ribs extending continuously from a lower to an upper portion of the vertical wall structure, the vertically spaced apart horizontal ribs extending continuously around the vertical wall structure, the grade level box having an upper edge extending generally horizontally around an upper portion of the box, the upper edge integrally molded to and supported by the vertical wall structure, and a bottom opening in the grade level box for receiving a below-ground electrical utility cable within the interior region of the box, the cover plate having an outer portion adapted for contacting the upper edge of the grade level box so that the cover plate outer portion resting on said upper edge is supported substantially continuously around the grade level box by the vertical wall structure.

10. Apparatus according to claim 9 including a concrete-containing ring adapted to be supported on the upper edge of the grade level box, the ring having an interior opening adapted for alignment with the open interior region within the grade level box.

11. Apparatus according to claim 10, in which an inside section of the ring is profiled to support a cover which optionally can be made from a concrete-containing material.

12. Apparatus according to claim 9, in which the wall structure is split into at least two parts to form a seam, and including upright abutting flanges integrally molded to the wall structure along the seam, and fastening means extending through the abutting flanges for securing opposite sides of the wall structure together as a rigid unit.

13. Apparatus according to claim 12, in which the wall structure is split longitudinally into two parts to form vertical seams along each end of the wall structure, and in which said abutting flanges are formed along each vertical seam.

14. Apparatus according to claim 9, in which the box is positioned in an opening in the ground, in which a below-ground electrical utility cable is contained within the interior region of the grade level box, and in which the cover plate is positioned in substantial alignment with ground level.

* * * * *